Sept. 22, 1964   C. R. GILLETTE   3,150,016
ANTIFRICTION BEARING
Filed Dec. 27, 1960

INVENTOR
Charles R. Gillette
BY Edward H. Goodrich
HIS ATTORNEY 3,150,016
ANTIFRICTION BEARING
Charles R. Gillette, Bristol, Conn., assignor to General Motors Corporation, Detroit, Mich., a corporation of Delaware
Filed Dec. 27, 1960, Ser. No. 78,424
3 Claims. (Cl. 148—6.14)

This invention relates to lubrication for antifriction bearings and particularly to a surface treatment and coating for minimizing the friction between metal surfaces in movable bearing engagement.

In most antifriction bearings having rolling elements, such as balls or rollers located between relatively rotatable race rings, and particularly in high speed antifriction bearings, it is usual to maintain the rolling elements in circumferentially spaced relation to each other through the use of an annular separator or cage. Such a separator or cage may be supported in slidable plain bearing engagement with annular lands at each side of one of the raceways which receives the rolling elements or the separator may be supported through frictional engagement with the rolling elements themselves. In both of these constructions, this separator support even in the presence of ample lubricant creates friction, heat and wear which may be damaging when such bearings are operated at high rotational speeds. Many separators are made from an iron silicon bronze alloy. However, when these iron silicon bronze separators are operated in a high speed bearing even in the presence of ample lubricant, the parts in sliding contact are subjected to considerable wear. When iron silicon bronze separators are in slidable lubricated engagement with annular lands on a race ring made of stainless steel, this wear is often sufficiently rapid to cause very short bearing life.

Base metals used for bearing components in rapidly moving plain bearing engagement under load, must be separated from each other by some form of lubricating film to prevent cold-welding of these components to each other under the influence of sliding friction. When such cold-welded parts are again placed in relative motion, these small welded joints usually fracture and create spalling, scuffing and wear debris.

High speed ball bearings operating under load are usually critical as to their lubrication requirements. A flood lubrication of such bearings can be as detrimental to the bearing as too sparse lubrication. An over-supply of lubricant often impedes the movements of the rolling elements creating heating and oxidation of the lubricant which is detrimental to the bearing and usually materially shortens bearing life. Consequently, in many high speed ball bearings, it is common practice to lubricate the bearing with a continuous flow of atomized lubricant and air through the bearing, this supply of lubricant being just sufficient to meet lubrication requirements.

However, it has been found that the ideal lubricating conditions in a high speed antifriction bearing for lubricating the rolling contact of the rolling elements against the raceways is often insufficient for proper lubrication of the plain bearing engagement of the separator against the annular lands on one of the race rings. Consequently, the lubrication within a high speed antifriction bearing usually has to be a compromise. Furthermore, in many high speed bearings provided with atomized lubrication, as common in certain aircraft installations, it has been found that if the lubricant is momentarily cut off from the bearing, bearing failure often occurs immediately. This failure usually starts with the unlubricated rubbing contact of the separator against one of the race rings. Consequently, it is recognized that if lubrication could be maintained between the separator and race ring engagement, the bearing even though operating under substantially no lubrication at contact of the rolling elements, could continue to operate for a considerable time.

It is, therefore, an object of my invention to provide an improved lubricating arrangement for an antifriction bearing.

It is a further object of my invention to provide an improved lubricating arrangement between the separator and one of the race rings in an antifriction bearing.

It is a further object of my invention to provide in an antifriction bearing an improved lubricating surface treatment for bearing members.

It is a still further object of my invention to provide an improved method for providing a lubricating surface coating on bearing parts in slidable engagement with each other.

To these ends and also to improve generally upon devices of this character, this invention consists in the various matters and methods hereinafter described and claimed. In its broader aspects, the invention is not necessarily limited to the specific structures selected for illustrative purposes in the accompanying drawings wherein:

Figure 1:
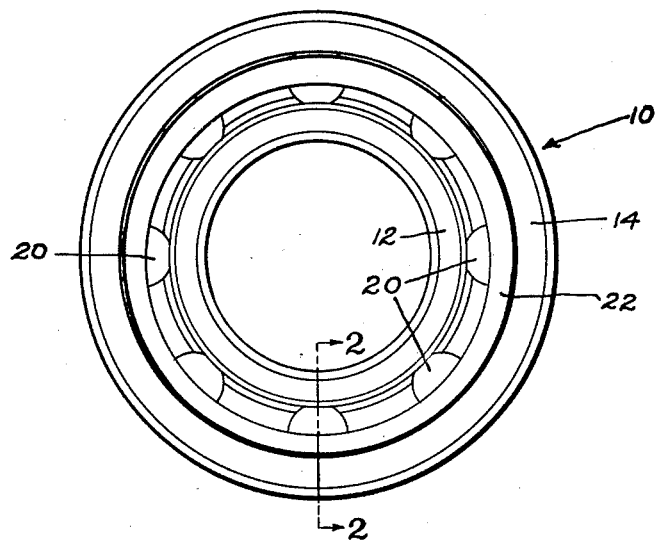
FIGURE 1 is an end view of my improved antifriction bearing.
Figure 2:
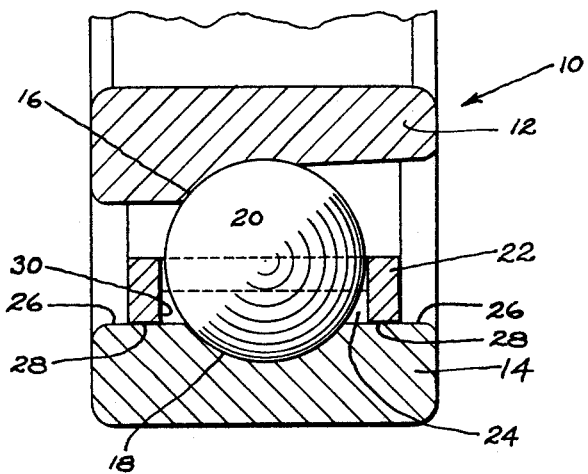
FIGURE 2 is an enlarged fragmentary sectional view taken along the lines 2—2 of FIGURE 1.

My invention provides an antifriction lubricant surface on relatively movable parts in sliding or rolling contact and is particularly effective in antifriction bearings such as high speed ball bearings. In the illustrated embodiment, an antifriction bearing as 10 has a pair of inner and outer race rings 12 and 14 respectively provided with coaxial annular raceways 16 and 18 in which a series of rolling elements 20, such as balls, may freely roll to provide for relative antifrictional race ring rotation. These balls 20 are circumferentially spaced from each other by an annular separator or cage 22. Each ball loosely fits within one of a series of circumferentially spaced ball pockets 24 in this separator and engages against a side of its ball pocket in plain bearing engagement. In the construction illustrated, one of the race rings, as the outer race ring 14, is provided at each side of its raceway 18 with an annular land 26 against which an annular rim 28 at each end of the cage 22 rotates in freely slidable plain bearing engagement. The inner portion of the separator 22 preferably lies in spaced relation to the other race ring, as the inner race ring 12. As an alternative, a similar plain bearing engagement could be provided between the inner annular surface at each end of the separator 22 and lands on the inner race ring 12 with the separator located in radially spaced relation to the outer race ring 14. Also, as another alternative, the separator 22 could be located in radially spaced relation to both race rings and the walls of each of the ball pockets could be shaped in at least partially conforming relation to the balls 20 to radially support the separator through its engagement with the balls.

In the event of insufficient or temporarily interrupted lubrication between the separator rims 28 and the lands at each side of one of the raceways, the separator objectionably heats, rapidly wears, and tears apart usually resulting in sudden failure of the bearing. To aid the lubrication of the annular plain bearing contacting surfaces as 26 and 28, I coat at least one of these surfaces with a metal oxide which has inherent lubricating properties and which additionally has an affinity for the lubricant which is normally present within the bearing. This metal oxide avoids the dangers of dry rubbing base metal contact between the separator 22 and the race ring which heretofore has often caused a cold-welding between these metal contacting surfaces. In the event that the separator is supported by the rolling elements, as the balls 20 and in spaced relation to the inner and outer race rings 12 and 14, I have found it advantageous to metal-oxide coat either the ball or preferably each annular wall 30 which slidably rides against and is supported by a ball 20. Similarly, in some constructions it has also been found advantageous to provide a thin metal oxide coating bonded to each of the raceways 16 and 18 to aid the lubricating contact of the rolling elements as they roll under load along these raceways.

I have found that the oxides of copper and particularly cupric oxide (CuO) is especially effective in providing a lubricant surface between relatively movable surfaces in bearing engagement. This copper oxide surface besides having a low coefficient of friction in contact with a metal surface, additionally has an affinity for lubricants present in a bearing thus further contributing to this low coefficient of friction. One or more of these surfaces in bearing engagement, such as the rims 28, ball pocket surfaces 30, or even the raceways 16 and 18 contacted by the rolling balls 20, may be electro-plated to provide a thin layer of copper intimately bonded thereto. This layer of metal copper is usually of appreciable thickness but may be as little as one ten thousandth of an inch thick. The copper coated surface is thereafter subjected to a suitable treatment to oxidize the copper metal to a copper oxide and preferably to cupric oxide (CuO). This may be accomplished by various methods. One arrangement that I effectively employ is to subject the copper to an oxidizing treatment in a hot alkali aqueous solution of an inorganic alkali-chlorine compound such as sodium or potassium chlorite as exemplified by the following:

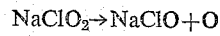

The sodium hypochlorite breaks down to form sodium chloride and nascent oxygen as follows:

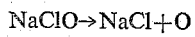

There is a sufficient amount of oxygen released to combine with the copper in the hot treatment solution to oxidize the surface portion of this copper and form a coating of cupric oxide (CuO) which is intimately bonded to the body of copper therebeneath. The temperature of my treatment solution and duration of treatment control the thickness of this antifriction oxide coating.

A sufficient amount of alkali such as sodium hydroxide is added to raise the boiling point of the aqueous solution preferably above 200° F. I have found it desirable to use my treatment solution at a temperature of 200° F. to 250° F. and the amount of sodium hydroxide may be as much as twice the amount of chlorite by weight. However, these proportions are not critical. In one test, a thickness of copper of one-half a thousandth of an inch was changed to cupric oxide when treated in such a solution at a temperature of 220° F. for approximately one hour. In the event that this separator is made from an alloy containing an appreciable amount of copper as is the case in an iron silicon bronze separator, the oxidizing treatment may be subjected directly to the separator without necessitating any initial copper plating operation. In such an instance, the entire surface of the separator is oxidized to the desired depth to provide an intimately bonded coating of cupric oxide. Bronze separators containing at least 75 percent copper have also been subjected to my oxidizing treatment which has produced very effective antifriction surface coatings. In testing the effectiveness of this copper oxide coating as a lubricant, a standard aircraft engine bearing provided with the usual steel separator had its atomized lubricant supply cut off which resulted in immediate failure of the bearing due to the metal to metal rubbing contact of the separator against the lands of the raceway. Similar bearings provided with my copper-oxide lubricant coating were thereafter subjected to the same test. These last-mentioned bearings operated satisfactorily and without detrimental separator wear for over four hours after the lubricant supply was cut off. Hence, this metal oxide treatment of various relatively movable contacting bearing parts effectively prevents bearing failure when there are temporary lapses in sufficient lubrication.

I claim:

1. The method of making an antifriction bearing comprising the steps of providing a pair of relatively movable metal members for antifrictional bearing engagement, plating a layer of copper on one of said members, treating said copper layer in an aqueous solution of an inorganic alkali-chlorite compound which will release oxygen under the influence of heat, heating said solution, and combining the released oxygen with the copper to oxidize the surface thereof to a cupric oxide which provides an antifriction bearing surface.

2. The method of making an antifriction bearing comprising the steps of providing a pair of metal members for relatively rotatable antifrictional bearing engagement, providing on at least one of said members an annular zone of copper adjacent the bearing engagement with the other member, treating said copper zone in an aqueous solution of an inorganic alkali-chlorite compound which will release oxygen therefrom, heating the solution to aid the release of oxygen, and combining the released oxygen with the surface of said copper zone to form a copper oxide coating bonded to the copper, said copper oxide providing an antifriction bearing surface.

3. The method of forming an annular antifriction bearing surface on a metal bearing member arranged for relatively rotatable plain bearing contact against another bearing member comprising the steps of providing the metal member with a copper-containing surface at the zone of said bearing contact, immersing the metal member in an aqueous solution containing an alkali and an inorganic alkali-chlorite compound, said alkali maintaining alkalinity of the solution, said alkali-chlorite compound breaking down and releasing oxygen in the presence of heat, heating the solution, and combining released oxygen with the copper in said copper-containing surface to provide on the metal member at the zone of bearing contact a cupric oxide coating bonded to the copper containing surface and having an inherently antifrictional surface.

References Cited in the file of this patent
UNITED STATES PATENTS

| | | |
|---|---|---|
| 1,661,448 | Taylor | Mar. 6, 1928 |
| 1,776,217 | Dooley | Sept. 16, 1930 |
| 2,202,773 | Given | May 28, 1940 |
| 2,364,993 | Meyer | Dec. 12, 1944 |
| 2,457,480 | Lewis | Dec. 28, 1948 |
| 2,460,898 | Meyer | Feb. 8, 1949 |
| 2,685,543 | Sindeband | Aug. 3, 1954 |
| 2,794,784 | Buselli | June 4, 1957 |

FOREIGN PATENTS

| | | |
|---|---|---|
| 466,849 | Canada | July 25, 1950 |
| 783,711 | Great Britain | Sept. 25, 1957 |